United States Patent [19]

Lebesgue

[11] 4,221,657

[45] Sep. 9, 1980

[54] BIOLOGICAL FERMENTATION SUBSTRATES

[75] Inventor: Yves Lebesgue, Colombes, France

[73] Assignees: Omnium d'Assainissement, Paris; Argiles et Mineraux, Montguyon, both of France

[21] Appl. No.: 944,482

[22] Filed: Sep. 20, 1978

Related U.S. Application Data

[62] Division of Ser. No. 764,556, Feb. 1, 1977, abandoned.

[30] Foreign Application Priority Data

Feb. 10, 1976 [FR] France .................................. 76 03573

[51] Int. Cl.² .................................................. C02C 1/04
[52] U.S. Cl. ....................................... 210/616; 106/72

[58] Field of Search ..................................... 106/71–73; 210/17, 150, 151

[56] References Cited

U.S. PATENT DOCUMENTS

| | | | |
|---|---|---|---|
| 3,928,190 | 12/1975 | Bebin | 210/17 X |
| 4,001,362 | 1/1977 | Delmon et al. | 106/72 X |
| 4,113,613 | 9/1978 | Sekoulov et al. | 210/17 |

Primary Examiner—Thomas G. Wyse
Attorney, Agent, or Firm—Browdy and Neimark

[57] ABSTRACT

Fired clays, in the form of medium-sized granulates containing small quantities of trace elements which serve as nutrients for microorganisms, are used as substrates for biological filters.

6 Claims, No Drawings

BIOLOGICAL FERMENTATION SUBSTRATES

This is a division of application Ser. No. 764,556 filed Feb. 1, 1977, now abandoned.

FIELD OF THE INVENTION

The present invention relates to the field of materials used as microorganism substrates in fermentation media. It especially concerns new substrates for biological filters and their application, in particular, in the field of waste-water treatment.

BACKGROUND OF THE INVENTION

For a long time use has been made in various industries of cultures of microorganisms such as bacteria or the like, which dispersed in an aqueous medium enriched to varying degrees with ionized or non-ionized minerals, feed on an organic or inorganic substrate under well-defined operating conditions (with regard to aeration, temperature, pH, etc) to effect a number of transformations by assimilation and metabolization. For example, according to a now-classic method of waste-water treatment, microorganisms are used to digest pollutants either in the form of sludges activated in fermentation basins or tanks or in the form of bacterial beds where the zoogloeas, composed of microorganisms or the like, are retained on a fixed substrate serving as a filtration bed for the water to be purified.

In this process of the bacterial bed type, it is usual to employ, as the fixed substrate, hydrated-silicate-based materials such as in particular natural or artificial pozzolanas or the like. The specificity of the species of microorganism adhering to the substrate is a function of the aqueous medium to be treated and of the nutrients the latter contains. In practice, it is desirable to maximize use of the active living mass or biomass, which needs a certain number of elements to support its growth, in particular nitrogen, phosphorus, and metals such as potassium, sodium, calcium, magnesium, manganese, etc. These elements are however not often found together in the pollutants of a given water. It is then very difficult to ensure that the various species contacting a given medium have an optimum growth rate.

Hence the problem arises of developing and having available a bacterial bed where all the species of microorganisms normally used always enjoy a maximum growth rate and where the biomass is fully retained and uniformly distributed on the filtration bed.

SUMMARY OF THE INVENTION

A fully satisfactory solution has now been found to the above problem, enabling the nutrient deficiencies of the media to be treated to be harmoniously made up and the criteria to be met for a substrate ensuring strong retention of the bacterial mass, namely good porosity and a large developed surface.

It is, accordingly, an object of the invention to overcome the deficiencies of the prior art, such as indicated above.

It is another object to provide improved substrates for microorganisms.

It is a further object to provide improved waste-water treatment.

Accordingly, the invention concerns novel substrates for biological filters which are made of fired clays, in the form of medium-sized granulates (2 to 25 mm) containing small quantities of trace elements serving as nutrients for the microorganisms adhering to said substrates.

DETAILED DESCRIPTION OF THE EMBODIMENTS among the principal trace elements present in the substrate clays, certain of which act in the trace state, metals such as iron, copper, zinc, manganese, molybdenum, cobalt, and aluminum may be cited in particular. These metals supplement the elements normally necessary for bacterial growth and which are either already present in the raw clay used as raw material or added to it, namely nitrogen, phosphorus, potassium, sodium, magnesium, calcium, etc.

The new biological substrates according to the invention, solid substances with controlled porosity, are obtained by adding the metal elements which are either lacking or insufficient to clays or any other mineral substrate with sufficient cohesion while raw (for example a mineral bound with bentonite, glue, clay, natural or synthetic resin, etc.). Among clays usable as raw materials one may cite in particular natural clays such as those of the illitic type (usually used for making tiles and bricks), the kaolinic type (refractories and ceramics), the montmorillonitic type, or mixtures of these. The quantity of elements to be introduced into the raw clay, or equivalent material, is determined by comparison between the chemical composition (in percent and in oxide) of the clay which has undergone calcination at over 1000° C. with the minimum amounts of the aforementioned metal elements which must be present in the final substrate; this is a routine investigation which must be carried out on each new starting raw clay in view of the variations in content among various clays, even of the same type, from different sites. It will also be understood that the desired metal content will depend to some extent on the nutritional needs of the proposed microorganism and on the nature of the waste-water to be treated, e.g. where the waste-water to be treated is rich in iron, or if the raw clay is rich in iron, then iron will not need to be added to the clay.

In general, however, and particularly if it is desired to standardize the manufacture of the granulated substrate, it is preferred to add to the raw clay the following metals (which in their oxide form become part of the granulated substrate) expressed in grams per kg. of clay: 5–10 gms Fe; 0.8 to 2.0 gms Cu; 0.5–3.0 gms Zn; 8–14 gms K; 2–5 gms Ca; 4–8 gms Mg; and 1–5 gms Mn. It will be understood, of course, that the presence of non-toxic (to the microorganisms) quantities of the additive metals in excess of the amounts indicated will not, in general be deleterious, so long as the porosity of the substrate is not adversely effected.

According to a particularly advantageous preparation process, which enables homogenous substrates of excellent porosity to be obtained, the mixture of raw clay and additives is effected by a dry method, the materials being ground, then moistened and kneaded to produce rolls which are fired at a temperature of 1200° to 1300° C., for example in a rotary kiln; the resulting chamotte is then ground and screened for desirable particle sizes, generally between 5 and 25 mm.

The substances added to the original clay are introduced in any suitable form, for example in the oxide or salt form for metals such as iron, copper, zinc, manganese, etc. or in the carbonated or silicated mineral state such as limestone, dolomite, talc, feldspar, and steatite for elements such as calcium, magnesium, and the like.

According to another method, one may operate in the presence of water whereby the raw materials, finely ground, are mixed in an aqueous dispersion medium, the paste obtained after concentration of the suspension being given a suitable form or shape (by drawing, extrusion, etc.) before firing in the kiln. Of course, variations may occur in these non-limitative processes according to the methods usually employed in the known manufacture of ceramic pastes.

The biological substrates according to the invention can profitably be applied to numerous fields; they are particularly suitable for use as fixed bacterial beds in the filtering of waste-water.

The example hereinbelow illustrates in an indicative manner the preparation of a fired-clay-based substrate doped according to the invention and shows its superiority over classical substrates of the pozzolana type in the aforementioned bacterial bed application.

EXAMPLE

The following powdered substances with a mean particle diameter of less than 100 microns are mixed in dry form in a helical screw device: a natural clay of the kaolinic type with iron oxide (possibly), copper oxide, zinc oxide, manganese dioxide, feldspar, and dolomite in quantities such that after firing, a material containing the following essential elements is obtained:

| Oxide form, wt. % | metal equivalent, g/kg of material |
|---|---|
| $Fe_2O_3$: 1.2 | Fe: 8 |
| CuO: 0.2 | Cu: 1.5 |
| ZnO: 0.1 | Zn: 1 |
| $K_2O$: 1.2 | K: 10 |
| $Na_2O$: 1.6 | Na: 12 |
| $MnO_2$: 0.6 | Mn: 4 |
| CaO: 0.6 | Ca: 4 |
| MgO: 1 | Mg: 6 | made up to 100% by the components of the basic clay itself, essentially silica and alumina.

After dry mixing, the composition is subjected to moistening with water, then kneading in a mixer fitted with an endless screw, producing rolls which are then fired in a rotary kiln at about 1300° C. The chamotte obtained is then ground in a jaw crusher, then screened to obtain granulates with the desired specific surface and a mean diameter of 10 to 20 mm.

This doped chamotte is used as a substrate for a waste-water filtration bacterial bed, using aerobic autotrophic nitrifying strains of the zoogleal type. Tests were performed in a pilot facility on glass columns on raw water which had merely been screen-filtered and on water cleaned additionally by decanting without the addition of flocculants and/or coagulants. For all these tests the flowrate of the water over the fixed bed was about 10 m/h, the flow being directed upward; the average air flowrate was adjusted to 250 l/h in the columns; the pH was about 7.7 to 7.8 and the temperature about 10° C.

Throughout the tests daily measurements were made of the amount of $NH_3$ eliminated from the treated water by the action of the bacterial bed, in order to calculate the yields of the nitrification operation. These yields are expressed in percent in Table 1 below where a comparison is made with a classical bacterial bed using a pozzolana substrate, all other conditions being equal:

Table 1

| Substrate | Water type | Yields (%) of $NH_3$ elimination | | | | |
|---|---|---|---|---|---|---|
| | | Day 1 | Day 2 | Day 3 | Day 4 | Day 5 |
| Pozzolana | Decanted | 10 | 18 | 20 | 36 | 30 |
| Doped chamotte | Decanted | 50 | 28 | 50 | 56 | 52 |
| Pozzolana | Raw | 10 | 18 | 21 | 18 | 30 |
| Doped chamotte | Raw | 35 | 36 | 50 | 52 | 60 |

As may be seen from these results, from the very first day of treatment the chamotte doped with trace elements according to the invention produces a spectacular improvement in the nitrification yield by comparison with classical biological filtration processes, by means of activation of the biomass whose growth rate is optimum. Similar results are obtained in the case of elimination of other pollutants from the water in the presence of corresponding bacterial strains.

Thus, due to the novel products according to the invention, it becomes possible considerably to improve the pollutant elimination yields and to effect appreciable economies in the purification treatment of waste-water by passage over bacterial beds.

It will be understood that the precise identity and quantity of the additive metals which should be added to any starting raw clay can be determined by conducting the routine tests in accordance with the above specific example. Thus a raw clay may be tested against varying samples having different additives in different quantities, and the correct combination of additives and the quantities thereof determined by the comparative nitrification yields.

It will be obvious to those skilled in the art that various changes may be made without departing from the scope of the invention and the invention is not to be considered limited to what is described in the specification.

What is claimed is:

1. In the process for the biological treatment of waste water comprising passing waste water over a substrate supporting microorganisms capable of digesting pollutants, the improvement wherein said substrate comprises a homogeneous composition in the form of porous granulates with a mean particle size of 2 to 25 mm formed of a fired clay base having small quantities of added trace elements therein in quantities sufficient to support growth of the microorganisms to be retained thereon, wherein said added trace elements comprise the following essential metals, present in the following quantities, expressed in grams per kg of clay:
Fe: 5 to 10; Cu: 0.8 to 2.0; Zn: 0.5 to 3; Na: 8 to 14; K: 8 to 14; Ca: 2 to 5; Mg: 4 to 8; and Mn: 1 to 5.

2. A process in accordance with claim 1 wherein said substrate is in the form of a biological filter.

3. A process according to claim 1, wherein said substrate is obtained by adding said trace elements to the raw clay in the form of the corresponding minerals or compounds and then firing at a temperature about 1000° C., the chamotte obtained then being ground and screened to the desired particle size.

4. A process according to claim 3, wherein the clay and trace elements are ground, subsequently moistened and kneaded to obtain rolls that are then fired and reduced to said granulates.

5. A process according to claim 3, wherein the clay and trace elements are ground, dispersed in an aqueous dispersion medium and then formed into said granulates.

6. A process according to claim 1, wherein the fired clay base is a natural clay of the illitic, kaolinic, or montmorillonitic type or a mixture of these substances.

* * * * *